United States Patent
Pinglikar

(10) Patent No.: US 9,122,806 B2
(45) Date of Patent: Sep. 1, 2015

(54) SATA DATA APPLIANCE FOR PROVIDING SATA HOSTS WITH ACCESS TO A CONFIGURABLE NUMBER OF SATA DRIVES RESIDING IN A SAS TOPOLOGY

(71) Applicant: LSI Corporation, Milpitas, CA (US)

(72) Inventor: Vidyadhar C. Pinglikar, Pune (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 353 days.

(21) Appl. No.: 13/687,689

(22) Filed: Nov. 28, 2012

(65) Prior Publication Data

US 2014/0149614 A1 May 29, 2014

(51) Int. Cl.
*G06F 13/00* (2006.01)
*G06F 13/38* (2006.01)
*G06F 13/364* (2006.01)
*G06F 13/40* (2006.01)

(52) U.S. Cl.
CPC ............ *G06F 13/385* (2013.01); *G06F 13/364* (2013.01); *G06F 13/4022* (2013.01)

(58) Field of Classification Search
CPC .................................................. G06F 9/4411
USPC .................................. 710/104–110, 305–317
See application file for complete search history.

(56) References Cited

U.S. PATENT DOCUMENTS

| | | | |
|---|---|---|---|
| 7,571,269 B2 | 8/2009 | Schmidt et al. | |
| 7,739,432 B1 * | 6/2010 | Shaw et al. | 710/74 |
| 7,797,488 B2 | 9/2010 | Wang | |
| 8,127,059 B1 * | 2/2012 | Carr et al. | 710/74 |
| 8,135,895 B2 | 3/2012 | Ji et al. | |
| 8,612,644 B2 * | 12/2013 | Kumasawa et al. | 710/36 |
| 2007/0050538 A1 | 3/2007 | Northcutt et al. | |
| 2007/0180172 A1 * | 8/2007 | Schmidt et al. | 710/105 |
| 2008/0126616 A1 * | 5/2008 | Kumasawa et al. | 710/42 |
| 2013/0166811 A1 * | 6/2013 | McKay et al. | 710/313 |
| 2014/0310441 A1 * | 10/2014 | Klughart | 710/301 |

* cited by examiner

Primary Examiner — Raymond Phan
(74) Attorney, Agent, or Firm — Suiter Swantz pc llo

(57) ABSTRACT

A method and apparatus for providing a SATA host with access to multiple SATA drives is disclosed. The apparatus may include: an emulated port multiplier for presenting at least one logical drive to the SATA host; a mapping module for maintaining a mapping between the at least one logical drive and a plurality of physical SATA drives, wherein the plurality of physical SATA drives reside in a SAS topology; and a SATA/STP bridge for providing an interface between the SATA host and the SAS topology, the SATA/STP bridge configured to function as a SATA target to communicate with the SATA host and to function as a STP initiator to communicate with the plurality of physical SATA drives in the SAS topology.

20 Claims, 3 Drawing Sheets

SAS Topology with SATA Drives

SATA DATA APPLIANCE FOR PROVIDING SATA HOSTS WITH ACCESS TO A CONFIGURABLE NUMBER OF SATA DRIVES RESIDING IN A SAS TOPOLOGY

TECHNICAL FIELD

The present invention relates to the field of data storage systems and particularly to storage systems utilizing the Serial AT Attachment (SATA) interface.

BACKGROUND

Serial AT Attachment (SATA) is a computer bus interface for connecting host bus adapters to mass storage devices such as hard disk drives and optical drives. Currently if a SATA host needs to access multiple SATA drives, it is done through a port multiplier which has a limitation of sixteen physical SATA drives and this is the maximum number of physical SATA drives which can be accessed by a legacy port multiplier aware SATA host. On the other hand, addressing schemes such as 48-bit Logical Block Addressing (LBA) with 512 byte sector size is 144 PiB (pebibyte). Since the maximum available size for a physical SATA drive is far less in capacity than 144 PiB, a large number of physical SATA drives may need to be group together. However, there is no efficient mechanism available to group the multiple physical SATA drives into one logical SATA drive which can be seen by the SATA host through a port multiplier.

Therein lies the need to provide a method and system to enable access of large number of SATA drives in a SAS topology to SATA hosts/initiators without the aforementioned shortcomings.

SUMMARY

Accordingly, an embodiment of the present disclosure is directed to an apparatus for providing a SATA host with access to multiple SATA drives. The apparatus may include: an emulated port multiplier for presenting at least one logical drive to the SATA host; a mapping module for maintaining a mapping between the at least one logical drive and a plurality of physical SATA drives, wherein the plurality of physical SATA drives reside in a SAS topology; and a SATA/STP bridge for providing an interface between the SATA host and the SAS topology, the SATA/STP bridge configured to function as a SATA target to communicate with the SATA host and to function as a STP initiator to communicate with the plurality of physical SATA drives in the SAS topology.

A further embodiment of the present disclosure is directed to a method for providing a SATA host with access to multiple SATA drives. The, the method comprising: presenting at least one logical drive to the SATA host; maintaining a mapping between the at least one logical drive and a plurality of physical SATA drives, wherein the plurality of physical SATA drives reside in a SAS topology; and providing an interface between the SATA host and the SAS topology, the interface configured to function as a SATA target to communicate with the SATA host and to function as a STP initiator to communicate with the plurality of physical SATA drives in the SAS topology.

An additional embodiment of the present disclosure is directed to a system. The system may include: at least one SATA host, a plurality of physical SATA drives residing in a SAS topology, and a SATA data appliance for providing the at least one SATA host with access to the plurality of SATA drives. The SATA data appliance may further include: an emulated port multiplier for presenting at least one logical drive to the at least one SATA host; a mapping module for maintaining a mapping between the at least one logical drive and the plurality of physical SATA drives in the SAS topology; and a SATA/STP bridge for providing an interface between the at least one SATA host and the SAS topology, the SATA/STP bridge configured to function as a SATA target to communicate with the at least one SATA host and to function as a STP initiator to communicate with the plurality of physical SATA drives in the SAS topology.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
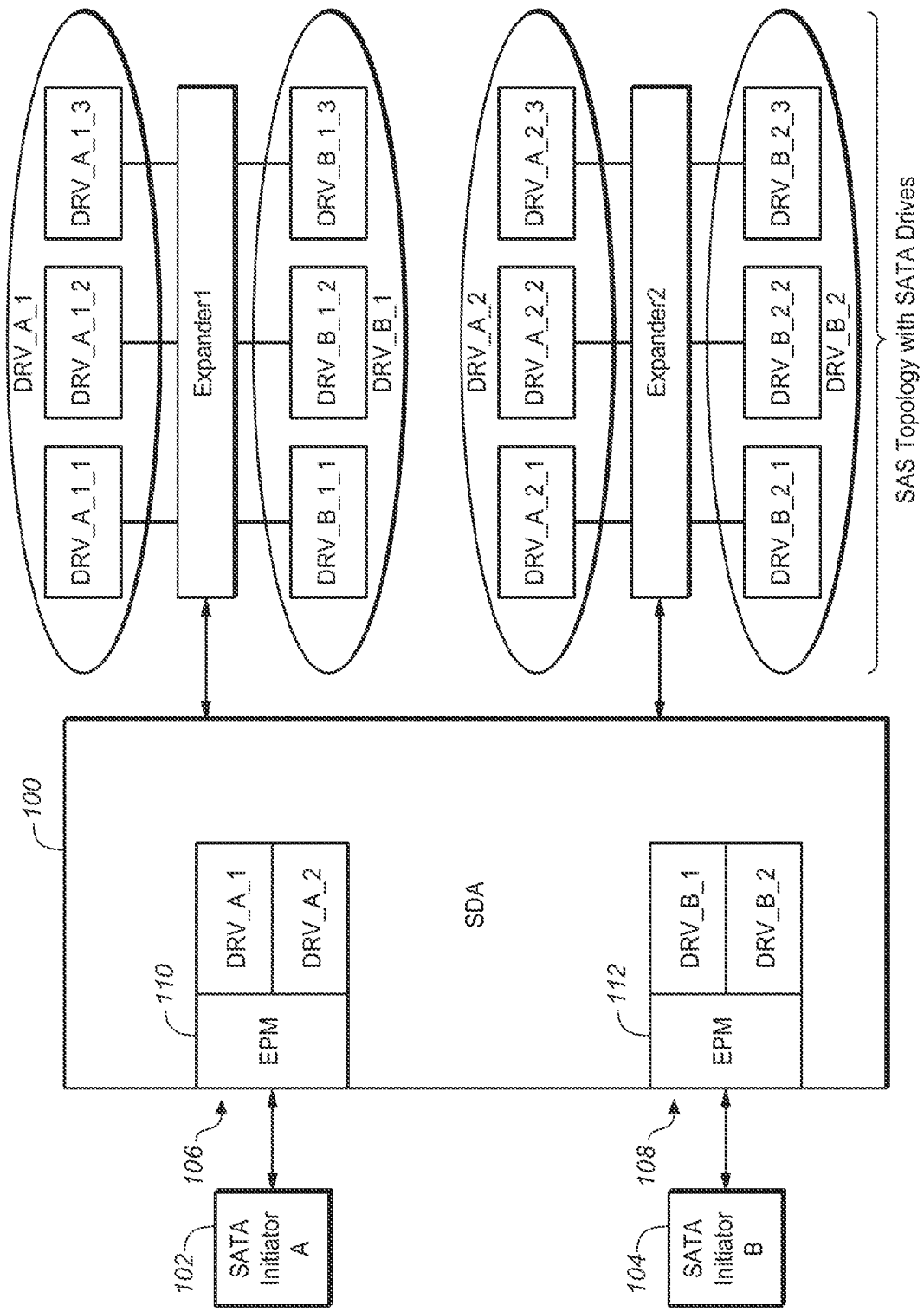
FIG. 1 is a block diagram illustrating an exemplary topology that utilizes a SATA Data Appliance in accordance with the present disclosure.

The present disclosure is directed to a method and system to enable access of large number of SATA drives in a SAS topology to SATA initiators/hosts. Referring to FIG. 1, a block diagram illustrating an exemplary topology that utilizes a SATA Data Appliance (may be referred to as SDA) 100 in accordance with the present disclosure is shown. In this exemplary topology, two SATA initiators 102 and 104 are communicatively coupled to the SATA Data Appliance 100. In one embodiment, the SATA initiators 102 and 104 and the SATA Data Appliance 100 are connected via SATA phys 106 and 108. However, it is contemplated that other communication interface implementations may be utilized without departing from the spirit and scope of the present disclosure.

In accordance with the present disclosure, each of the phys that receives a SATA initiator is associated with an Emulated Port Multiplier (EPM). While a SATA port multiplier is a device that allows multiple SATA drives to be connected to a single SATA host port, an EPM is an emulated module that allows multiple logical/virtual drives to be presented to the SATA host port. For instance, SATA phy 106 is connected to EMP 110, which is connected to logical drives A1 and A2. Similarly, SATA phy 108 is connected to EMP 112, which is connected to logical drives B1 and B2.

Also shown in the exemplary topology, the SATA Data Appliance 100 is connected to Serial Attached SCSI (SAS) topology through SAS phys which are configured as expander phys. In the exemplary topology shown in FIG. 1, three physical SATA drives jointly form one logical SATA drive. In this manner, each initiator 102 or 104 will have access to size of six SATA physical drives which are seen as two logical SATA drives behind the Emulated Port Multiplier 106 and 108 that corresponds to the initiator 102 and 104, respectively.

It is contemplated that while each of the Emulated Port Multipliers 106 and 108 depicted in the topology above is connected to two logical drives, the actual number of logical drives associated with each Emulated Port Multiplier may vary without departing from the spirit and scope of the present disclosure. Furthermore, the SAS topology depicted supports various number of SATA drives and allows various number of SATA drives to be grouped into a logical drive. This allows the logical drive presented to the initiator to be large enough for any Logical Block Addressing scheme that is being utilized, including the 48-bit LBA or the like. It is also contemplated that the number of SATA initiators that can be communicatively coupled to the SATA Data Appliance 100 is not limited to two. Any number of SATA initiators may be utilized without departing from the spirit and scope of the present disclosure.

Figure 2:
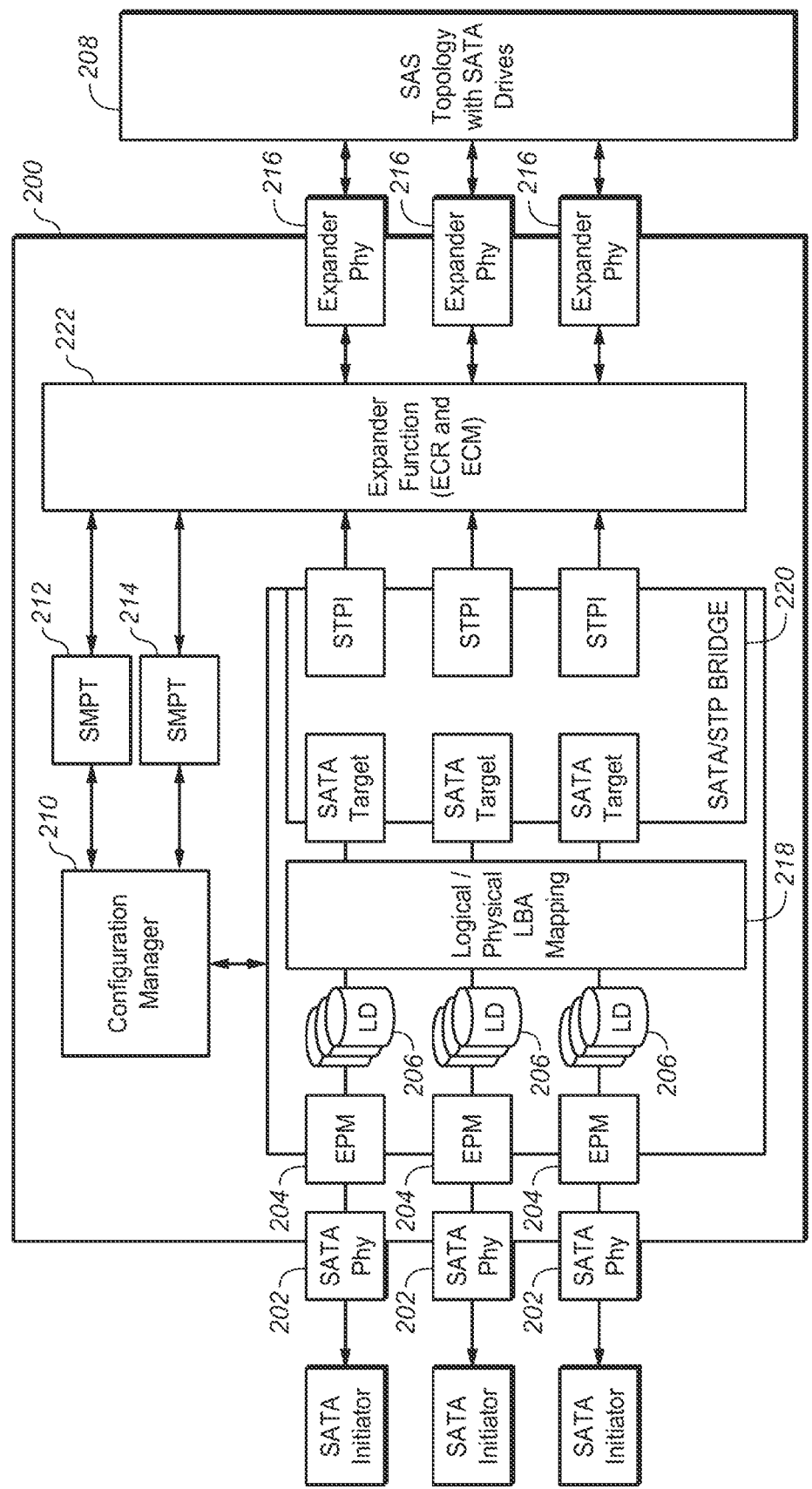
FIG. 2 is a block diagram illustrating one embodiment of the SATA Data Appliance.

Referring now to FIG. 2, a block diagram depicting a particular embodiment of the SATA Data Appliance 200 is shown. As described previously, each SATA phy 202 is associated with an Emulated Port Multiplier (EPM) 204, and each EPM 204 is in turn associated with at least one logical drive 206. The logical drives are the ones that will be discovered by the SATA initiators when enumerating the port multipliers connected drives. The SATA Data Appliance 200 processes commands from the SATA initiators and responds to the SATA initiators accordingly. In that sense, the SATA Data Appliance 200 encapsulates the underline physical implementation of the storage devices from the SATA initiators.

Each data command request for a particular logical drive is converted into the physical drive request by mapping the LBA address for that logical drive into corresponding physical LBA address for the mapped drive. This process is performed by the logical/physical LBA mapping module 218. In addition, the LBA mapping module 218 also performs the required host-to-device and device-to-host Frame Information Structure (FIS) monitoring and modification for a given command.

More specifically, for inbound frame reception, the LBA mapping module 218 receives a SATA FIS from a SATA initiator for a particular logical drive, converts the received SATA FIS to SATA FIS for a corresponding physical drive, sets the active target SAS address to be used by the SATA/STP bridge 220 for transferring this FIS, and sends the FIS to a SATA target port on the SATA/STP bridge 220 for further process. For outbound frame transmission, on the other hand, the LBA mapping module 218 receives a SATA FIS for a physical drive from the SATA/STP bridge 220, obtains the active target SAS address set by the SATA/STP bridge 220 for the given SATA FIS, converts the SATA FIS to SATA FIS for corresponding logical drive based on the active target SAS Address, and sends the converted SATA FIS to the SATA initiator.

The SATA/STP bridge 220 is configured to function as a SATA target on one side to interface with a SATA initiator and function as a Serial Tunneling Protocol (STP) initiator on the other side to interface with an expander 222 connected to the SATA targets. A unique STP initiator SAS address is assigned to each port. To handle an inbound frame reception, the SATA/STP bridge 220 receives the physical SATA FIS from the LBA mapping module 218, prepares the STP initiator frame with the SAS address of the port and the active SATA target SAS address set by LBA mapping address for that port, and then sends the STP initiator frame to the corresponding SATA target drive over the SAS topology 208. To handle an outbound frame transmission, the SATA/STP bridge 220 receives a STP frame from a physical SATA drive from the SAS topology 208, sets the active target SAS address set by looking at the source SAS address of the SATA drive in the STP frame, and passes the SATA FIS received in the STP frame to the LBA mapping module 218.

It is contemplated that multiple physical SATA drives in the SAS topology 208 can be grouped into logical drives 206. The number of physical drives that can be grouped into one logical drive is limited only by the addressing scheme being utilized. For instance, if 48-bit LBA is utilized, the 48-bit LBA addressing scheme provides the upper limit on how many physical drives can be grouped into one logical drive. Specific number of physical SATA drives grouped into a particular logical drive is a design choice and may vary without departing from the spirit and scope of the present disclosure.

In one embodiment, the grouping is managed by a configuration manager 210, which is communicatively coupled with a Serial Management Protocol (SMP) target 212 and a SMP initiator 214. The SMP initiator 214 is utilized to discover the SATA drives in the SAS topology 208. The configuration manager utilizes the information regarding SAS addresses of the SATA drives in the SAS topology 208 to configure the logical SATA drives connected to each Emulated Port Multiplier (EPM) 204. The configuration manager 210 also includes information regarding SAS addresses assigned to the STP initiators. Utilizing the information provided by the configuration manager 210, the SMP target 212 is able to report the physical expander phy 216 that is connected to the SAS topology 208 along with the virtual STP initiator in the SATA/STP bridge 220 that corresponds to the SATA target in the SATA/STP bridge 220 for a given data command. This ability allows the SATA Data Appliance 200 to route the data commands as described above.

It is contemplated that aside from the SATA phys 202 and the expander phys 216, the various modules of the SATA Data Appliance 200 may be implemented as separate or integrated components without departing from the spirit and scope of the present disclosure, as long as they carry out their intended functions as described above. One or more processors and computer-readable devices having computer-executable instructions may be utilized to implement such intended functions. Furthermore, it is understood that the various modules of the SATA Data Appliance 200 are functionally distinct from one another, but may not necessarily be physically separated from each other.

The SATA Data Appliance implemented in accordance with the present disclosure where SATA initiators are provided access to configurable number of SATA drives residing in a SAS topology may be appreciated in various computing systems. Currently, support for attaching a SATA initiator/ host to an expander is not defined in the SAS Specification. The SATA Data Appliance, more particularly the SATA/STP bridge and the Emulated Port Multipliers in accordance with the present disclosure, enables access of large number of SATA drives in a SAS topology to SATA initiators. In addition, as the storage devices are connected over SAS, other benefits such as smart copy between multiple hosts, can also be implemented utilizing the SATA Data Appliance as the underline communications mechanism.

Figure 3:
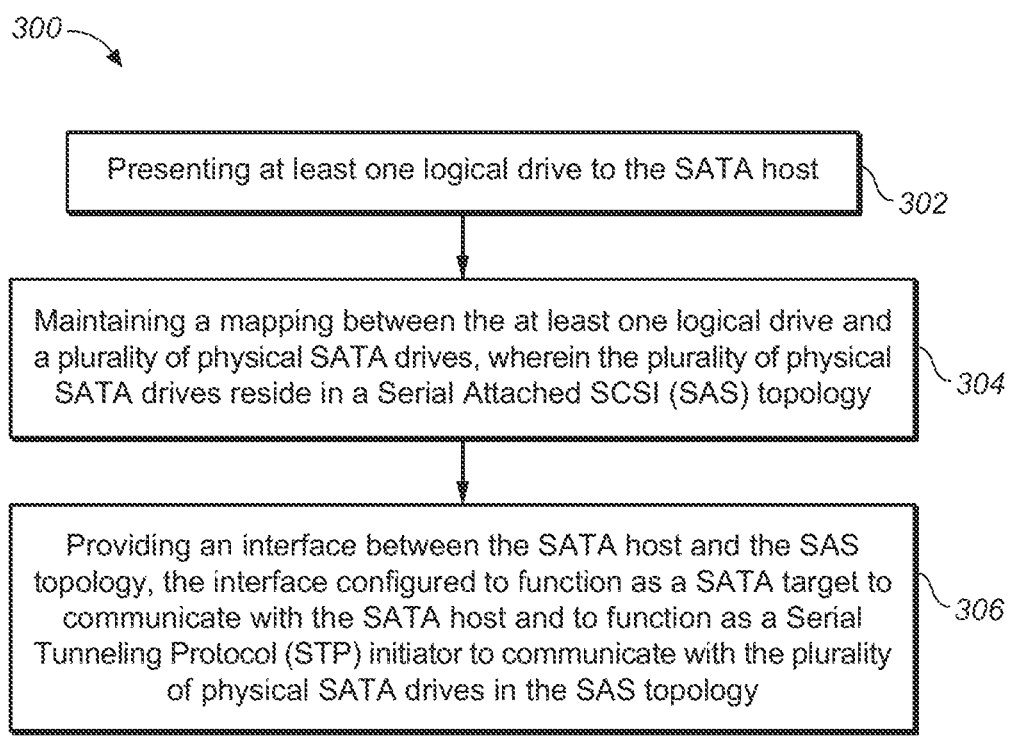
FIG. 3 is a flow diagram illustrating a method for providing a SATA host with access to multiple SATA drives in accordance with the present disclosure.

Referring now to FIG. 3, a flow diagram illustrating a method 300 for providing a SATA host with access to a configurable number of SATA drives residing in a SAS topology is shown. In accordance with the present disclosure, one or more logical drives are presented to the SATA host in step 302. Step 304 maintains a mapping between the logical drives and a plurality of physical SATA drives residing in a SAS topology. Step 306 provides an interface between the SATA host and the SAS topology. As described above, the interface between the SATA host and the SAS topology is configured to function as a SATA target when it is communicating with the SATA host. On the other hand, the interface between the SATA host and the SAS topology is configured to function as a STP initiator when it is communicating with the plurality of physical SATA drives residing in the SAS topology. Utilizing the mapping between the logical drives and the physical SATA drives as well as the interface between the SATA host and the SAS topology, the SATA host is able to access a plurality of physical SATA drives residing in the SAS topology without being limited by the maximum number of drives supported using a conventional port multiplier.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus for providing Serial AT Attachment (SATA) hosts with access to SATA drives, the apparatus comprising:
    a first emulated port multiplier for a first SATA host, the first emulated port multiplier configured for presenting a first set of at least one logical drive accessible to the first SATA host;
    a second emulated port multiplier for a second SATA host, the second emulated port multiplier configured for presenting a second set of at least one logical drive accessible to the second SATA host;
    a mapping module for maintaining a mapping between the first and second sets of logical drives and a plurality of physical SATA drives, wherein the plurality of physical SATA drives reside in a Serial Attached SCSI (SAS) topology; and
    a SATA/Serial Tunneling Protocol (STP) bridge for providing an interface between the first and second SATA hosts and the SAS topology, the SATA/STP bridge configured to function as a SATA target to communicate with each of the first and second SATA hosts, and the SATA/STP bridge further configured to function as a STP initiator to communicate with the plurality of physical SATA drives in the SAS topology.

2. The apparatus of claim 1, wherein the mapping module maintains a mapping between each Logical Block Addressing (LBA) address in the first and second sets of logical drive to a corresponding LBA address in one of the plurality of physical SATA drives.

3. The apparatus of claim 1, further comprising:
    a Serial Management Protocol (SMP) initiator for discovering the SATA drives in the SAS topology.

4. The apparatus of claim 1, further comprising:
    at least one phy in compliance with SATA phy specification for communication with each of the first and second SATA hosts.

5. The apparatus of claim 1, wherein the apparatus is in communication with the plurality of physical SATA drives in the SAS topology via at least one SAS expander.

6. A method for providing Serial AT Attachment (SATA) hosts with access to SATA drives, the method comprising:
    presenting at least one logical drive to a SATA host;
    maintaining a mapping between the at least one logical drive and a plurality of physical SATA drives, wherein the plurality of physical SATA drives reside in a Serial Attached SCSI (SAS) topology; and
    providing an interface between the SATA host and the SAS topology, the interface configured to function as a SATA target to communicate with the SATA host and to function as a Serial Tunneling Protocol (STP) initiator to communicate with the plurality of physical SATA drives in the SAS topology, wherein the SATA host is permitted to access only the plurality of physical SATA drives mapped to the at least one logical drive presented to the SATA host.

7. The apparatus of claim 3, further comprising:
    a configuration manager for managing information regarding SAS addresses of the SATA drives in the SAS topology discovered by the SMP initiator.

8. The apparatus of claim 7, further comprising:
    a SMP target for reporting connection data to the SATA/STP bridge to facilitate data routing between the SATA host and one of the plurality of physical SATA drives in the SAS topology.

9. The method of claim 6, wherein each Logical Block Addressing (LBA) address in the at least one logical drive is mapped to a corresponding LBA address in one of the plurality of physical SATA drives.

10. The method of claim 6, further comprising:
    presenting a second set of at least one logical drive to a second SATA host;
    maintaining a mapping between the second set of at least one logical drive and a plurality of physical SATA drives, wherein the plurality of physical SATA drives reside in the SAS topology; and
    providing an interface between the second SATA host and the SAS topology, the interface configured to function as a SATA target to communicate with the second SATA host and to function as a STP initiator to communicate with the plurality of physical SATA drives in the SAS topology, wherein the second SATA host is permitted to access only the plurality of physical SATA drives mapped to the second set of at least one logical drive presented to the second SATA host.

11. The method of claim 6, further comprising:
    discovering the SATA drives in the SAS topology; and recording and managing information regarding SAS addresses of the SATA drives discovered in the SAS topology.

12. The method of claim 11, further comprising:
utilizing SAS addresses of the SATA drives discovered in the SAS topology to facilitate data routing between the SATA host and one of the plurality of physical SATA drives in the SAS topology.

13. A system, comprising:
at least one Serial AT Attachment (SATA) host;
a plurality of physical SATA drives residing in a Serial Attached SCSI (SAS) topology; and
a SATA data appliance for providing the at least one SATA host with access to the plurality of SATA drives, the SATA data appliance comprising:
   an emulated port multiplier for presenting a set of at least one logical drive accessible to each SATA host of the at least one SATA host;
   a mapping module for maintaining a mapping between the at least one logical drive and the plurality of physical SATA drives in the SAS topology; and
   a SATA/Serial Tunneling Protocol (STP) bridge for providing an interface between each SATA host of the at least one SATA host and the SAS topology, the SATA/STP bridge configured to function as a SATA target to communicate with each SATA host of the at least one SATA host and to function as a STP initiator to communicate with the plurality of physical SATA drives in the SAS topology, wherein each particular SATA host of the at least one SATA host is permitted to access only the set of at least one logical drive presented to the particular SATA host.

14. The system of claim 13, wherein the mapping module maintains a mapping between each Logical Block Addressing (LBA) address in the at least one logical drive to a corresponding LBA address in one of the plurality of physical SATA drives.

15. The system of claim 13, wherein the SATA data appliance further comprises:
   a Serial Management Protocol (SMP) initiator for discovering the SATA drives in the SAS topology.

16. The system of claim 13, wherein the at least one SATA host is communicatively coupled to the SATA data appliance via at least one phy in compliance with SATA phy specification.

17. The system of claim 13, wherein the SATA data appliance is communicatively coupled to the plurality of physical SATA drives in the SAS topology via at least one SAS expander.

18. The system of claim 13, wherein each Logical Block Addressing (LBA) address in the at least one logical drive is mapped to a corresponding LBA address in one of the plurality of physical SATA drives.

19. The system of claim 15, wherein the SATA data appliance further comprises:
   a configuration manager for managing information regarding SAS addresses of the SATA drives in the SAS topology discovered by the SMP initiator.

20. The system of claim 19, wherein the SATA data appliance further comprises:
   a SMP target for reporting connection data to the SATA/STP bridge to facilitate data routing between the at least one SATA host and one of the plurality of physical SATA drives in the SAS topology.

* * * * *